US011972117B2

(12) United States Patent
Meiri et al.

(10) Patent No.: US 11,972,117 B2
(45) Date of Patent: Apr. 30, 2024

(54) SELECTING SURVIVING STORAGE NODE BASED ON ENVIRONMENTAL CONDITIONS (71) Applicant: EMC IP Holding Company LLC, Hopkinton, MA (US)

(72) Inventors: David Meiri, Somerville, MA (US); Xiangping Chen, Sherborn, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 347 days.

(21) Appl. No.: 17/379,668

(22) Filed: Jul. 19, 2021

(65) Prior Publication Data

US 2023/0019241 A1 Jan. 19, 2023

(51) Int. Cl.
*G06F 3/06* (2006.01)

(52) U.S. Cl.
CPC .......... *G06F 3/0622* (2013.01); *G06F 3/0637* (2013.01); *G06F 3/0673* (2013.01)

(58) Field of Classification Search
CPC .... G06F 3/0622; G06F 3/0637; G06F 3/0673; G06F 3/0617; G06F 3/0631; G06F 3/067
See application file for complete search history.

(56) References Cited

U.S. PATENT DOCUMENTS

| | | | | |
|---|---|---|---|---|
| 5,527,003 A | * | 6/1996 | Diesel | G05D 1/101 244/76 R |
| 5,958,009 A | * | 9/1999 | Friedrich | H04L 43/10 709/224 |
| 6,105,094 A | * | 8/2000 | Lindeman | G06F 13/362 710/240 |
| 7,739,541 B1 | * | 6/2010 | Rao | G06F 11/1425 714/13 |
| 7,793,051 B1 | * | 9/2010 | Nguyen | G06F 12/00 711/147 |
| 8,473,462 B1 | * | 6/2013 | Banerjee | G06F 16/176 707/661 |
| 9,626,378 B2 | * | 4/2017 | Bernbo | G06F 16/1834 |
| 10,895,972 B1 | * | 1/2021 | Apostolatos | G06F 16/26 |
| 11,068,461 B1 | * | 7/2021 | Chan | G06F 16/26 |
| 11,086,802 B1 | * | 8/2021 | Jalal | G06F 13/404 |
| 11,130,422 B1 | * | 9/2021 | Goldfarb | B63B 79/15 |
| 11,347,607 B1 | * | 5/2022 | Tylik | G06F 11/2079 |
| 11,481,116 B2 | * | 10/2022 | Tavallaei | G06F 12/023 |
| 11,487,594 B1 | * | 11/2022 | Ehmann | G06F 9/544 |
| 11,563,764 B1 | * | 1/2023 | Hoscheit | G06F 21/577 |
| 11,734,636 B2 | * | 8/2023 | Harry | G06Q 10/0635 705/7.28 |
| 2001/0007971 A1 | * | 7/2001 | Okada | G05B 19/4065 702/182 |
| 2002/0108077 A1 | * | 8/2002 | Havekost | G05B 23/0289 714/47.2 |
| 2002/0120819 A1 | * | 8/2002 | Hickson | G06F 9/5016 711/163 |

(Continued)

*Primary Examiner* — Aravind K Moorthy (74) *Attorney, Agent, or Firm* — Krishnendu Gupta; Deepika Bhayana; Derek Lam (57) ABSTRACT

A method may select a surviving storage node based on environmental conditions. A request for exclusive access to a volume is received. A score based on data associated with an environment of the node is determined for each node in a cluster. Based on the scores, a node to grant exclusive access to the volume is identified, and such exclusive access is granted to the identified node.

20 Claims, 6 Drawing Sheets

(56) References Cited

U.S. PATENT DOCUMENTS

| | | | |
|---|---|---|---|
| 2003/0110157 A1* | 6/2003 | Maki | G06F 3/067 |
| 2003/0126381 A1* | 7/2003 | Vo | G06F 9/526 711/151 |
| 2003/0149848 A1* | 8/2003 | Ibrahim | H04L 67/1097 711/163 |
| 2004/0034724 A1* | 2/2004 | Bruner | G11B 27/105 360/69 |
| 2004/0068619 A1* | 4/2004 | Van Doren | G06F 12/0828 711/144 |
| 2004/0207965 A1* | 10/2004 | Ausserlechner | H01L 27/0251 361/56 |
| 2006/0020778 A1* | 1/2006 | Edrington | G06F 13/1694 713/1 |
| 2006/0227664 A1* | 10/2006 | Horak | G01S 5/20 367/136 |
| 2007/0050563 A1* | 3/2007 | Alsup | G06F 9/3842 711/145 |
| 2007/0113233 A1* | 5/2007 | Collard | G06F 9/522 718/101 |
| 2007/0219751 A1* | 9/2007 | Huang | H04Q 9/00 702/187 |
| 2007/0226423 A1* | 9/2007 | Arimilli | G06F 12/084 711/141 |
| 2007/0247767 A1* | 10/2007 | Zhang | H02H 3/006 361/42 |
| 2008/0022030 A1* | 1/2008 | Hagiwara | G06F 13/364 710/308 |
| 2008/0120441 A1* | 5/2008 | Loewenstein | G06F 12/0815 710/22 |
| 2008/0129740 A1* | 6/2008 | Itagaki | G06F 16/50 345/502 |
| 2008/0253386 A1* | 10/2008 | Barum | H04W 40/16 370/406 |
| 2008/0320230 A1* | 12/2008 | Vishin | G06F 12/0817 711/141 |
| 2009/0094430 A1* | 4/2009 | Bergheaud | G06F 9/526 711/163 |
| 2009/0119461 A1* | 5/2009 | Cypher | G06F 12/0808 711/E12.001 |
| 2009/0157770 A1* | 6/2009 | Havewala | G06F 3/0674 707/999.203 |
| 2010/0100655 A1* | 4/2010 | Dowedeit | G06F 9/526 710/200 |
| 2011/0191496 A1* | 8/2011 | Luo | H04W 4/70 709/247 |
| 2012/0027030 A1* | 2/2012 | Naito | G04G 7/00 370/503 |
| 2012/0144107 A1* | 6/2012 | Asher | G06F 3/0637 711/111 |
| 2012/0144138 A1* | 6/2012 | Kandasamy | G06F 9/524 711/E12.001 |
| 2012/0245791 A1* | 9/2012 | Yun | B60W 50/0205 701/31.9 |
| 2013/0297552 A1* | 11/2013 | Bansal | H04L 51/52 706/50 |
| 2013/0339630 A1* | 12/2013 | Alexander | G06F 12/0891 711/144 |
| 2014/0015568 A1* | 1/2014 | Shimamune | H03G 3/3042 327/103 |
| 2014/0040410 A1* | 2/2014 | McDowell | G06F 3/0647 709/212 |
| 2014/0134955 A1* | 5/2014 | Honda | G01S 5/02 455/67.11 |
| 2014/0171749 A1* | 6/2014 | Chin | G16H 40/60 600/300 |
| 2014/0281234 A1* | 9/2014 | Power | G06F 12/0815 711/141 |
| 2015/0208464 A1* | 7/2015 | Heo | H04W 4/70 702/189 |
| 2015/0325272 A1* | 11/2015 | Murphy | G06F 12/0284 711/147 |
| 2015/0347055 A1* | 12/2015 | Truong | G06F 3/0653 711/168 |
| 2015/0350318 A1* | 12/2015 | Van Assche | H04L 67/1095 709/202 |
| 2015/0378800 A1* | 12/2015 | Suzuki | G06F 3/064 714/49 |
| 2016/0117105 A1* | 4/2016 | Thangaraj | G06F 3/0604 711/103 |
| 2016/0117267 A1* | 4/2016 | Witt | G06F 12/1466 711/111 |
| 2016/0126741 A1* | 5/2016 | Ito | H02J 3/381 307/82 |
| 2016/0212007 A1* | 7/2016 | Alatorre | H04L 41/04 |
| 2016/0218933 A1* | 7/2016 | Porras | H04L 41/147 |
| 2016/0259742 A1* | 9/2016 | Faulkner | G06F 3/0653 |
| 2016/0305232 A1* | 10/2016 | Bird | E21B 47/001 |
| 2016/0327417 A1* | 11/2016 | Hara | G05B 23/0221 |
| 2017/0249082 A1* | 8/2017 | Litke | G06F 3/0604 |
| 2017/0318060 A1* | 11/2017 | Wang | H04W 76/10 |
| 2018/0026644 A1* | 1/2018 | Shankar | G06F 3/0673 326/41 |
| 2018/0227202 A1* | 8/2018 | Aravot | H04L 43/0811 |
| 2018/0234478 A1* | 8/2018 | Das | G06F 3/0643 |
| 2018/0260120 A1* | 9/2018 | Ozguner | G06F 3/061 |
| 2018/0270381 A1* | 9/2018 | Ikuta | H04N 1/00896 |
| 2018/0270927 A1* | 9/2018 | Daroussin | B60Q 1/04 |
| 2018/0276142 A1* | 9/2018 | Algieri | G06F 3/0619 |
| 2018/0278055 A1* | 9/2018 | Shaik | H02J 3/00 |
| 2018/0307297 A1* | 10/2018 | Semeria | G06F 1/3228 |
| 2019/0042118 A1* | 2/2019 | Lu | G06F 3/0623 |
| 2019/0042440 A1* | 2/2019 | Kumar | G06F 3/0607 |
| 2019/0108152 A1* | 4/2019 | Lee | G06F 9/5038 |
| 2019/0108739 A1* | 4/2019 | Wedig | G08B 29/186 |
| 2019/0163404 A1* | 5/2019 | Pedersen | G06F 3/0683 |
| 2019/0193520 A1* | 6/2019 | Tsunoda | B60H 1/3205 |
| 2019/0196917 A1* | 6/2019 | Ma | G06F 3/0653 |
| 2019/0278644 A1* | 9/2019 | Chen | G06F 11/0709 |
| 2019/0278672 A1* | 9/2019 | Jin | G06F 11/2089 |
| 2019/0294554 A1* | 9/2019 | Bryant | G06F 12/0846 |
| 2019/0317945 A1* | 10/2019 | Ezick | G06F 16/254 |
| 2019/0347167 A1* | 11/2019 | Wang | G06F 11/1464 |
| 2019/0387009 A1* | 12/2019 | Kondaveeti | H04L 63/1425 |
| 2020/0042733 A1* | 2/2020 | Chen | G06F 9/526 |
| 2020/0192721 A1* | 6/2020 | Mclean | G06F 9/5061 |
| 2020/0272972 A1* | 8/2020 | Harry | H04L 41/0894 |
| 2020/0314218 A1* | 10/2020 | Kumar | G06F 13/4221 |
| 2020/0314607 A1* | 10/2020 | Hwang | H04W 24/06 |
| 2020/0403991 A1* | 12/2020 | Sohail | H04L 63/1433 |
| 2021/0089366 A1* | 3/2021 | Wang | G06F 15/163 |
| 2021/0126935 A1* | 4/2021 | Todd | H04L 63/1466 |
| 2021/0176036 A1* | 6/2021 | Gulati | H04L 9/0825 |
| 2021/0208817 A1* | 7/2021 | Shin | G06F 3/0679 |
| 2021/0306414 A1* | 9/2021 | Beard | G06F 12/0813 |
| 2021/0317618 A1* | 10/2021 | Hu | E01B 1/004 |
| 2021/0365301 A1* | 11/2021 | Rao | G06F 3/0605 |
| 2022/0050613 A1* | 2/2022 | Muchherla | G06F 3/0616 |
| 2022/0100398 A1* | 3/2022 | Raff | G06F 3/0655 |
| 2022/0138055 A1* | 5/2022 | Gothi | G06F 16/122 707/674 |
| 2022/0334971 A1* | 10/2022 | Malewicki | G06F 12/084 |
| 2022/0342558 A1* | 10/2022 | Longo | G06F 11/3419 |

* cited by examiner

SELECTING SURVIVING STORAGE NODE BASED ON ENVIRONMENTAL CONDITIONS

BACKGROUND

Technical Field

The disclosure is related to the field of data storage, and more particularly to operation of clustered data storage systems.

SUMMARY OF THE INVENTION

One aspect of the current technique is a method for selecting a surviving storage node based on environmental conditions. A request for exclusive access to a volume is received. A score based on data associated with an environment of the node is determined for each node in a cluster. Based on the scores, a node to grant exclusive access to the volume is identified, and such exclusive access is granted to the identified node.

A first request from a first node and a second request from a second node may be received. Data from sensors at sites of the nodes in the cluster may be requested. Values for each sensor may be determined based on the response from the sensor. If the response from the sensor corresponds to normal conditions at the environment of the node, the sensor may be assigned a positive value. If the response from the sensor corresponds to abnormal conditions at the environment of the node, the sensor may be assigned a negative value. If the sensor failed to respond to the request for data, the sensor may be assigned a negative value. The magnitude of the value may depend on whether the response from the sensor corresponds to normal or abnormal conditions at the environment of the node, or whether the sensor failed to respond to the request for data. The values of the sensors associated with a particular node in the cluster may be summed or normalized. A node whose score is at least a threshold amount greater than the scores of other nodes in the cluster is selected for exclusive access to the volume.

Another aspect of the current technique is a system with at least one processor. The at least one processor is configured to receive a request for exclusive access to a volume; determine, for each node in a cluster, a score based on data associated with an environment of the node; identify, based on the scores, a node to grant exclusive access to the volume; and grant exclusive access to the volume to the identified node. The at least one processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Consider an active/active arrangement in which two data storage systems present a single data storage object, such as a volume 26. The volume 26 data is available through paths going to both systems, which may be referred to as "System A" and "System B". Every write to A is replicated to B synchronously, and similarly, every write to B is replicated to A, synchronously. The two systems maintain a cluster between them via a Time to Live (TTL) mechanism, where one system (preferred) grants TTL to its peer (non-preferred). In this basic, TTL-only arrangement, the non-preferred system lives at the mercy of the preferred system, and once its TTL expires, it goes offline. In the case of a failure, the non-preferred system always becomes unavailable (due to expiration of its TTL), and if any other system in the cluster survives, that system becomes the preferred system.

When one of the systems cannot replicate a write, the system must be made unavailable, thereby breaking the cluster. Surviving systems continue processing I/O requests from hosts. As indicated above, in the 2-node, TTL-only arrangement, the survivor (if any) is always preferred. The TTL mechanism is used to guarantee that no "split brain" situation occurs, i.e., the situation in which both systems are processing host I/Os (Reads and Writes) but no replication is occurring. Using TTL, once one system cannot replicate to its peer, TTL request/grant stops and the non-preferred eventually becomes unavailable. At that point, the preferred system is allowed to service I/O requests, and to process writes without replicating them to its peer.

There are conditions in which it is possible and desirable for the non-preferred system to survive and continue processing host I/O requests, while the preferred system is made unavailable. A simple example is the complete failure of the preferred system. Rolling disasters, such as power failures, earthquakes, or fires, may cause communication between systems in a cluster to fail, and such disasters may also cause systems to become unavailable.

To improve availability by allowing for a system to survive when possible, a disclosed approach employs a separate "witness node" and protocol to enable a system to provide single-node access to a storage volume 26 (also referred to herein as "exclusive access") after a failure within the cluster. When communication between the systems fails, both systems may contact the witness node to request becoming the preferred system (also referred to herein as "polarization"). In the rolling disasters described above, a system in an affected site may successfully communicate with the witness node, but subsequently become unavailable and thus incapable of servicing I/O requests. To ensure an unavailable system does not become a preferred system, the witness node may take into account environmental information about the sites where the systems reside, when determining which system shall become preferred.

In at least some implementations in accordance with the techniques as described herein, one or more of the following advantages can be provided: continued storage availability to hosts through the selection of an available system to continue servicing I/O requests, and selection of a system without human intervention.

Figure 1:
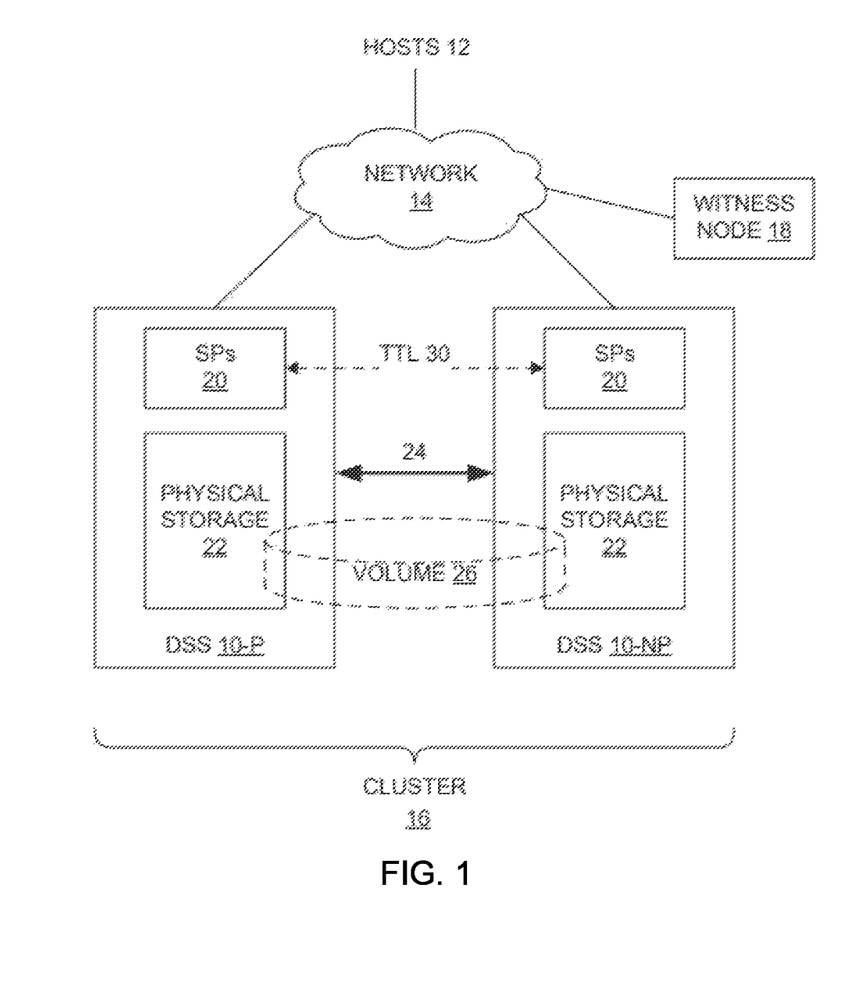
FIG. 1 depicts a block diagram of an exemplary data processing system with clustered data storage systems providing access to a volume 26.

FIG. 1 shows a data processing system having a plurality of data storage systems (DSSs) 10 and host computers (HOSTS) 12 functionally coupled by one or more data communications networks 14. The DSSs 10 constitute a clustered storage system 16, also referred to as a "cluster" herein. In the cluster 16, the DSSs 10 are designated as "preferred" 10-P and "non-preferred" 10-NP, which reflects their roles in a TTL mechanism as described more below. The system also includes a computerized device referred to as a "witness node" 18. The DSSs 10, which are also referred to as "storage nodes", "nodes", and "arrays" herein, include respective storage processors (SPs) 20 and physical storage 22. Each storage processor 20 includes processors, memory and interface logic enabling it to execute storage related functionality using the associated physical storage 22 for underlying actual data storage, i.e., processing host I/O requests (reads and writes) from the hosts 12. The physical storage 22 may be realized by known secondary storage technology such as magnetic disk, flash memory, etc.

As shown, the system further includes one or more replication links 24 between the DSSs 10, which may be distinct physical links or logical links carried via the network 14. For ease of reference the singular "replication link" is used in this description. Also shown is a logical volume 26 that can be accessed by the hosts 10 via both the DSSs 10, under normal operating conditions. In one embodiment the cluster 16 is a high-availability cluster whose nodes/DSSs 10 reside in different physical locations, such as different buildings of a campus or across some other limited geographic area (e.g., tens of miles). The volume 26 may be referred to as a "stretched" volume 26, referring to its logical presence on such physically separated DSSs 16. In normal operation, each DSS 10 services host I/O requests to the volume 26, which includes replicating write-type requests to the other DSS 16 via the replication link 24. Although the present description is based on access to a volume 26 specifically, it will be appreciated that the disclosed technique may be used with other types of data storage objects such as files, containers, etc.

Also shown is a special logical session referred to as "time to live" or TTL 30, which is used as part of protection against failure, and in particular to protect against the so-called "split brain" problem in which one DSS 10 is modifying its local copy of the volume 26 without such modifications also being made on the other DSS 10, resulting in data corruption. Using TTL 30, one DSS 10 ("preferred") regularly grants permission for continued operation to the other DSS 10 ("non-preferred"), so that both DSSs 10 provide host access to the volume 26 as long as this permission stays in effect. Under various failure conditions, the TTL mechanism 30 either fails itself (signifying the failure) or it is used in a manner that signals a separately detected failure from one DSS 10 to the other (i.e., by stopping the requesting or granting of permission). Additional details are given below. As also explained below, the witness node 18 is also involved in processing during failure conditions, namely in helping select a DSS 10 which is to survive a failure and provide sole, single-node access to the volume 26 to the exclusion of the other DSS 10. Because of the protection function of the witness node 18, it is preferably in a different fault domain than either of the DSSs 10, e.g. in a different building or other physical location to improve its availability when there is a failure affecting one or both DSSs 10 or the replication link 24.

Figure 2:
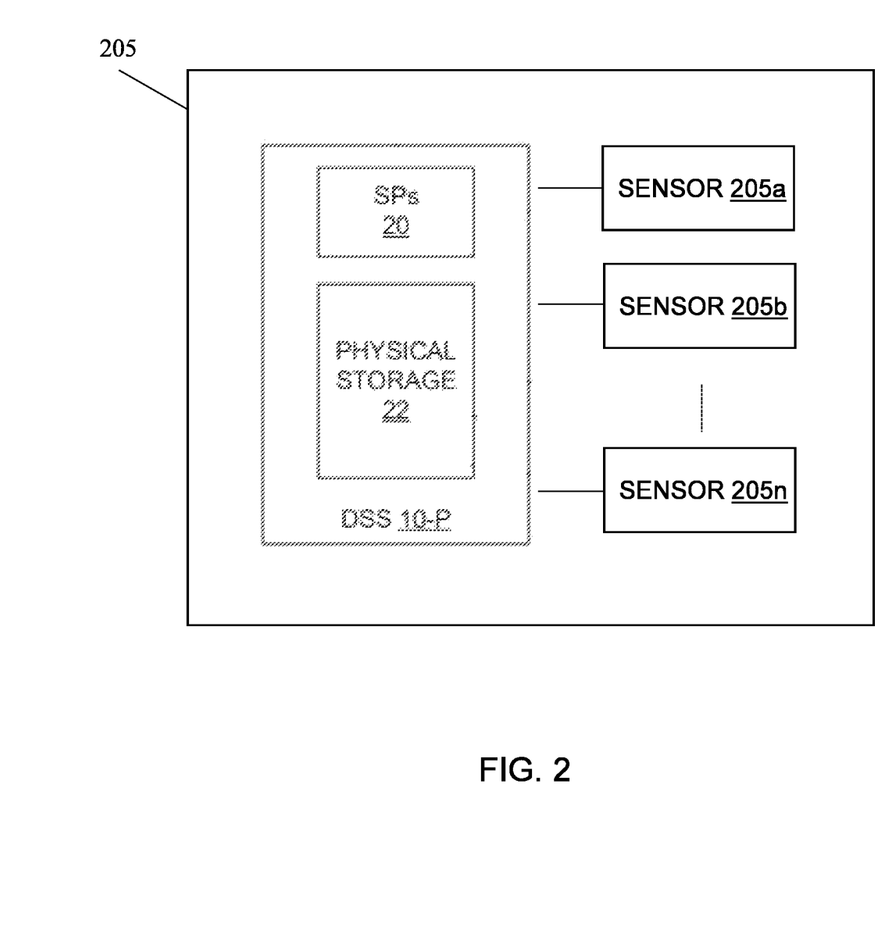
FIG. 2 depicts a block diagram of a site of a data storage system, with sensors that gather data regarding the environment.

FIG. 2 is block diagram showing a site 205 of a DSS 10. Although the site 205 depicted is of a preferred DSS 10-P, similar sites 205 may also be arranged for non-preferred DSSs 10-NP. In addition to the DSS 10, the site 205 includes sensors 205*a*, 205*b*, . . . 205*n* (individually and collectively, "205") that collect data regarding the site's 205 environment. In various embodiments, the data can convey temperatures at various locations around the site 205, as well as the availability of power and/or detected vibrations, among other conditions. The sensors 205 can transmit data over the network 14 to the witness node 18, and in some embodiments, the sensors 205 also communicate data to the DSS 10.

Figure 3:
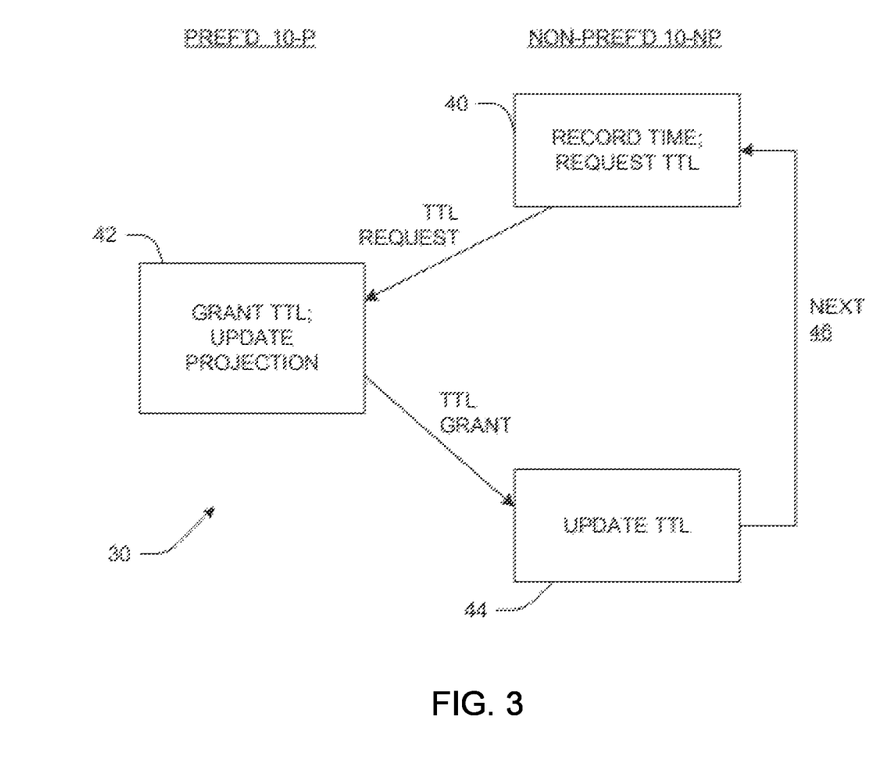
FIG. 3 is a messaging and flow diagram of basic operation of a time-to-live (TTL) mechanism.

FIG. 3 illustrates the essential operation of the TTL mechanism 30, in the form of a combination flow diagram and messaging diagram between a preferred DSS (Pref'd) 10-P and a non-preferred DSS (Non-Pref'd) 10-NP. Preferred and Non-Preferred statuses may be assigned by configuration data or system management activity preceding the illustrated operation. The assignment may be arbitrary or it may be based on some relevant substantive difference between the DSSs 10. Overall, operation is a succession of short loops based on a short timer (e.g., one second) at the non-preferred DSS 10-NP. A given iteration starts at 40 where the non-preferred DSS 10-NP records its local time and sends a TTL request message to the preferred DSS 10-P, requesting a new TTL period of ongoing operation. The duration of the TTL period is typically fixed and is some amount greater than the repetition period of the process, such as 5 seconds for example. At 42, the preferred DSS 10-P receives and processes the TTL request. It records its own local time, updates a projection of the TTL expiration time, and sends a message back to the non-preferred DSS 10-NP granting the new TTL. Additional details of this operation are given below. At 44 the non-preferred DSS 10-NP receives the grant message and uses it to update/refresh its own local TTL. This process iterates at regular intervals (e.g., one second) as indicated at Next 46.

Each of the DSSs 10 maintains a TTL expiration time, which is periodically refreshed and used in conjunction with a system time-of-day (TOD) to monitor for expiration of TTL. Whenever the TOD value is higher than the expiration time, it means TTL has expired and the DSS 10 initiates polarization. From time to time, the "TTL expiration time" is updated (via TTL requests). Thus, under normal circumstances the "TTL expiration time" is always in the future, and as the TOD clocks is ticking, TTL updates keep moving the TTL expiration time ahead so that it stays in the future. If TTL updates stop, due to a failure, eventually the TOD clock progresses past the TTL expiration timer and polarization will be triggered.

The preferred DSS 10-P uses its TTL expiration timer to track its projection of the expiration of the TTL timer at the non-preferred DSS 10-NP. When a failure occurs (which may be intermittent), TTL grant requests (or responses) are not being transferred on the link 24, and one or both arrays 10 see their TTL timer expiring. When an array timer expires, the array 10 stops servicing I/O requests and starts queuing them instead, while also invoking the polarization process to resolve which of the two arrays 10 should survive. The TTL mechanism alone would dictate that only the preferred DSS 10-P should survive, if any. However, additional functionality involving the witness node 18 can result in the non-preferred DSS 10-NP surviving in some cases, as explained more below. If only one of the arrays 10 has connectivity to the witness node 18, there is a strong indication that the other DSS 10 has been isolated (e.g., in a data center failure), and the DSS 10 with the intact witness connectivity should prevail even if it is the non-preferred DSS 10-NP. If both DSSs 10 have connectivity to the witness node 18 so as to send requests for polarization, the witness node 18 determines which DSS 10 should be granted exclusive access to a volume 26.

Figure 4:
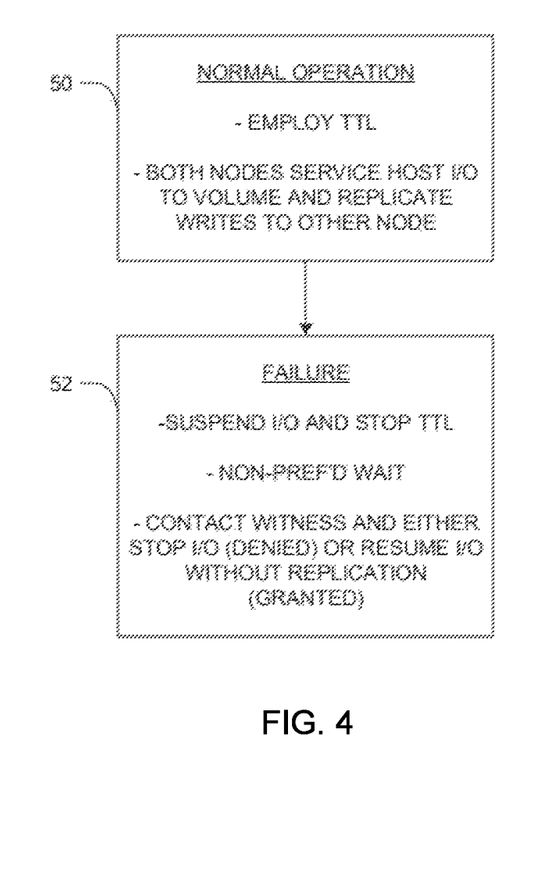
FIG. 4 is a simplified flow diagram of overall operation of a data storage system using the TTL mechanism as well as interaction with a separate witness node to avoid so-called "split brain" condition and data corruption.

FIG. 4 illustrates overall operation of a DSS 10 in pertinent part. Operation of the two nodes 10-P and 10-NP is essentially the same except for their asymmetric TTL roles.

At 50, normal operation occurs in which the DSS 10 employs a time-to-live (TTL) mechanism by which a preferred node 10 of a clustered pair regularly communicates permission for continued operation to a non-preferred node of the clustered pair in response to regular TTL requests therefrom. It will be understood that the use of the TTL mechanism differs between the preferred and non-preferred nodes 10-P, 10-NP accordingly, and as described above. Also at 50, assuming regular non-errored operation of the TTL mechanism, both DSSs 10 service host I/O requests to the volume 26 and replicate write-type requests to the other DSS 10 of the pair, in order to maintain synchronization of the local copies of the volume 26.

At 52, a node detects a failure of replication, which may be indicated by errored operation of the TTL mechanism, and performs a polarization operation to select a surviving node 10 to transition to single-node access to the volume 26. "Errored" operation refers to the situation in which the TTL timer at either/both the DSSs 10 reach zero. The polarization process may include:

(1) Suspending the servicing of the host I/O requests and stopping TTL operation (withholding requests and grants). Host I/O requests may be queued for processing after completion of polarization.

(2) At least one of the preferred DSS 10-P and non-preferred DSS 10-NP contacts the witness node 18 to request survivor status, so as to gain exclusive access to the volume 26.

(3) The witness node 18 determines which nodes shall be granted survivor status.

(4) The node 10 granted survivor status continues to service host I/O requests to the volume 26 without replicating write-type requests to the other node 10.

(5) The other node, based on being denied survivor status, discontinues servicing of host I/O requests to the volume 26.

It will be appreciated that using the above scheme, there are conditions in which the non-preferred DSS 10-NP receives survivor status and continues operation, to the exclusion of the preferred DSS 10-P. This can occur, for example, if the preferred DSS 10-P completely fails and is unable to contact the witness node 18, in which case the witness node 18 receives a polarization request from the non-preferred DSS 10-NP and allows it to become the survivor.

For clarity, it is emphasized that active/active replication failure can stem from either TTL failure or a failure to replicate a write request. This description employs the term "replication" to refer to the active/active mechanism, and in this case, there are the types of following failures that cause polarization:

1. Inability to replicate a host write within a specified time window

2. Inability to get timely response to TTL requests, resulting in expiration of the TTL timer In cases of rolling disasters, disruptions to the environment of a DSS 10 may render the DSS 10 unavailable for servicing I/O requests from hosts 12. Because a DSS 10 may successfully communicate with the witness node 18 to request polarization before the disaster fully renders the DSS 10 unavailable, the witness node 18 needs to assess the DSS's 10 suitability independently. As previously explained, sensors 205 collect data about the environments of each DSS 10. The witness node 18 may analyze the data to determine if a DSS's 10 ability to request polarization belies its unavailability to service I/O requests, such that polarization should not be granted.

When the witness node 18 receives a request for polarization from a DSS 10, the witness node 18 attempts to avoid granting polarization to any DSS 10 that may be unavailable and thus incapable of servicing I/O requests. In response to such a request, the witness node 18 may set a timer and send requests to sensors 205 for data about the environments of the sites. In many embodiments, the length of time of the timer is shorter than the timeout for a host (e.g., 1 second for the timer, compared to 3 seconds for the host). As the witness node 18 limits the amount of time the sensors 205 have to respond and selects a survivor node 10 accordingly, the survivor node 10 may assume responsibility for the volume 26 without interrupting service to the hosts 12.

Depending on its state, a sensor 205 may not respond to the witness node's request for data 18. For example, in event of fire, temperature probes 205 may have melted, and in event of an earthquake, vibrations may have disrupted equipment so as to fall upon and break vibration sensors 205. Floods may wash away sensors 205, and power outages may leave sensors 205 without the ability to communicate with the witness node 18. Due to the possible inferences for non-responsive sensors 205, the witness node 18 assigns such sensors 205 negative scores.

In other situations, a sensor 205 may respond to the witness node 18, but provide data that indicates that the DSS 10 is operating in a sub-optimal environment. Should a hurricane destroy part of a building at a site, a humidity probe 205 may return values far higher than usual. Alternatively, abnormally high values may indicate that the heating, ventilation, and air conditioning (HVAC) system on site has failed. If a power system is facing irregularities, a sensor 205 may indicate that voltages/currents to the buildings have fluctuated significantly over the past 24 hours, or that multiple interruptions have occurred. Vibration sensors 205 may indicate the site has recently experienced tremors, thereby carrying risks of after effects. Due to the possible inferences for responsive sensors 205 returning concerning data, the witness node 18 assigns such sensors 205 negative scores. In many embodiments, the negative scores have lower magnitudes than those assigned for non-responsive sensors.

Sites that have not experienced any major disruptions or irregularities will have sensors 205 that respond to the witness node 18 with normal values, and the witness node 18 assigns these sensors 205 positive scores.

In some embodiments, a score for a sensor 205 can be binary. Thus, a positive score would be "1", for responsive sensors 205 reporting normal values, and a negative score would be "0", for non-responsive sensors 205 or responsive sensors 205 reporting abnormal values. In other embodiments, a score may fall within a range, such as 0 to 10. For example, if a sensor 205 is non-responsive, it may be assigned a score of 0, and if it is responsive and reporting normal values, it may be assigned a score of 10. If the sensor 205 is responsive but reporting abnormal values, its score may depend on the extent to which the values deviate from normal conditions. For example, a sensor 205 that reports 3 power outages of 30+ minutes within the past 24 hours may be given a score of 3, whereas a sensor 205 that reports a single power outage of 5 minutes within the past 24 hours may be given a score of 7. A temperature probe 205 reporting a temperature of 5 degrees higher than normal may be given a score of 8, where a probe 205 reporting a temperature of 40 degrees higher than normal may be given a score of 2.

After the witness node 18 assigns values to the sensors 205 based on the returned data, the witness node 18 determines a score for each site corresponding to a DSS 10. The witness node 18 may sum the values of the sensors 205 at a particular site. If all of the sites have the same number and type of sensors 205, the witness node 18 may simply compare the site scores. However, when sites differ in the number and type of sensors 205, the witness node 18 may normalize the site scores. For example, the witness node 18 may average the scores of the sensors 205 at a site. Alternatively, the scores may be normalized according to a scale of 0 to 100. Thus, if the maximum score for a site is 50, the actual score of the site may be multiplied by 2 before being compared to the normalized score of other sites. In another example, for a site with 15 sensors 205, the sum of the sensor 205 scores may be multiplied by (100/15) to obtain a normalized score.

When the timer set by the witness node 18 elapses, the witness node 18 identify the DSS 10 to which exclusive access to the volume 26 will be granted. In some embodiments, only one DSS 10 sends the request for polarization to the witness node 18, and thus the request is granted regardless of the scores. In other embodiments, the witness node 18 receives the request from more than one node 10. The witness node 18 compares the scores for the nodes. Polarization may be granted to the DSS 10 with the higher score. In some embodiments, the score for one DSS 10 must be appreciably higher than the score for the others 10 for that DSS 10 to be granted polarization. One score may need to be at least 15% higher, although other thresholds and metrics for comparing the scores may be used.

If the scores for the DSSs 10 are not appreciably different, the witness node 18 may grant polarization to the preferred DSS 10. Alternatively, the witness node 18 may grant polarization to the DSS 10 whose request was received first. In some situations, if none of the DSSs 10 are preferred (e.g., the preferred DSS 10 is unavailable, and there is no preference among the remaining DSSs 10), then the first DSS 10 that requested polarization will receive exclusive access to the volume 26.

Figure 5:
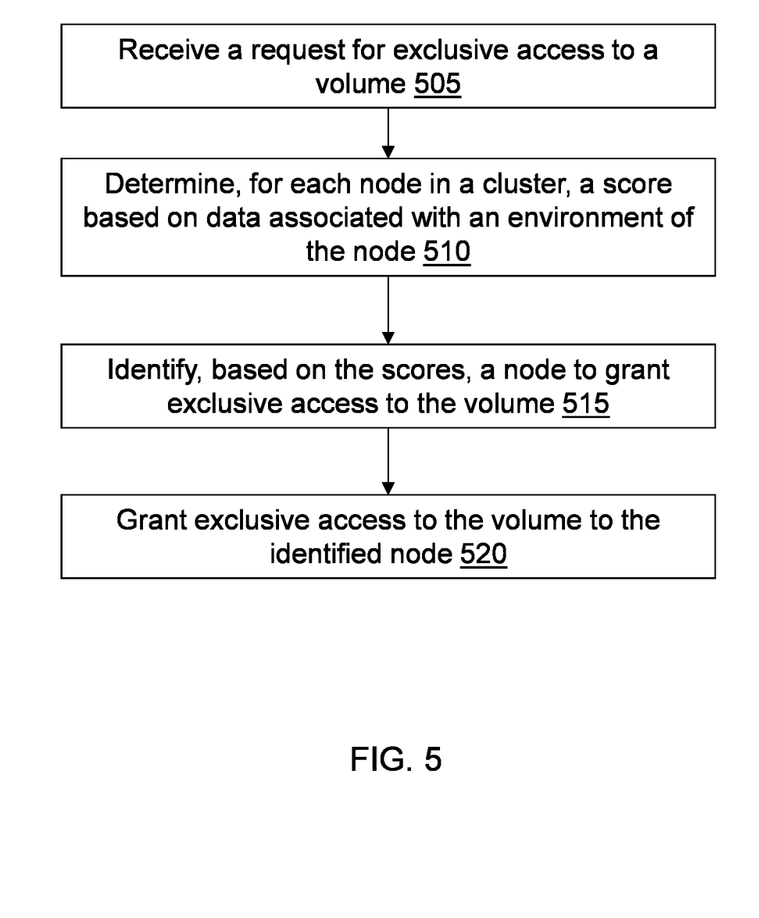
FIGS. 5 and 6 are exemplary flow diagrams of the techniques described herein.

FIGS. 5 and 6 are exemplary flow diagrams of methods 500 and 600 describing techniques discussed herein. For the method illustrated in FIG. 5, a witness node 18 receives a request for exclusive access to a volume 26 (step 505). The witness node 18 determines, for each node 10 in a cluster 16, a score based on data associated with an environment of the node 10 (step 510). The witness node 18 identifies, based on the scores, a node 10 to grant exclusive access to the volume 26 (step 515). The witness node 18 grants exclusive access to the volume 26 to the identified node 10 (step 520).

Figure 6:
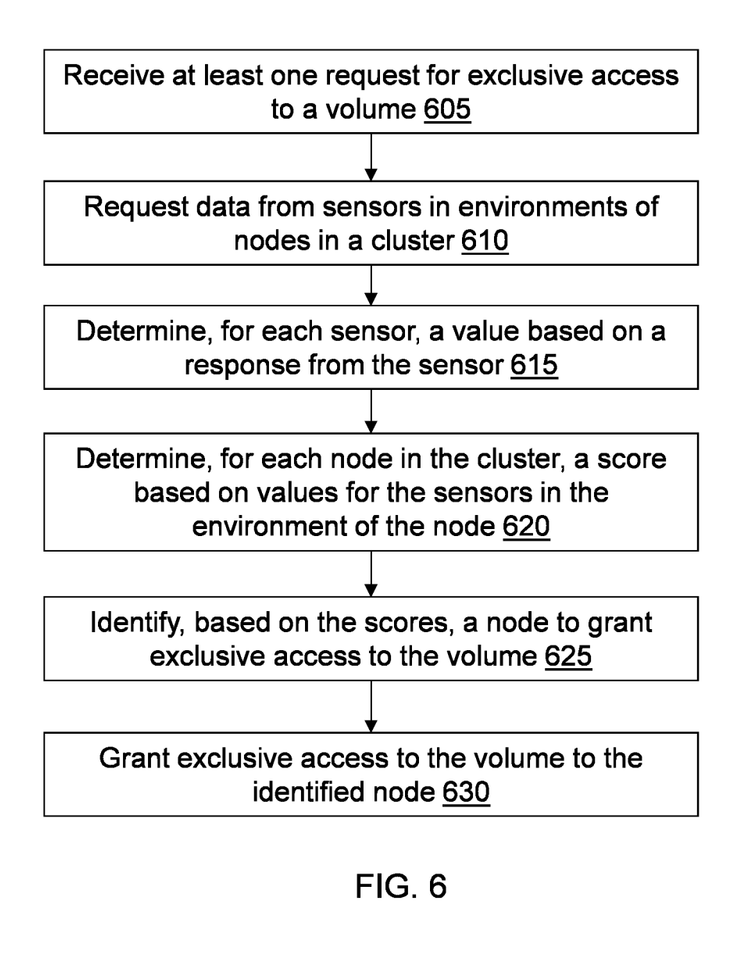

For the method illustrated in FIG. 6, a witness node 18 receives at least one request for exclusive access to a volume 26 (step 605). The witness node 18 requests data from sensors 205 in environments of nodes 18 in a cluster 16 (step 610). The witness node 18 determines, for each sensor 205, a value based on a response from the sensor 205 (step 615). The witness node 18 determines, for each node 10 in the cluster 18, a score based on values for the sensors 205 in the environment of the particular node 10 (step 620). The witness node 18 identifies, based on the scores, a node 10 to grant exclusive access to the volume 26 (step 625). The witness node 18 grants exclusive access to the volume 26 to the identified node 10 (step 630).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method comprising:

receiving a request for exclusive access to a volume;

determining, for each node in a cluster, a score based on data associated with an environment of the node, wherein the determining includes:

using data from sensors at sites of the nodes in the cluster to determine a value for each sensor based on whether a response from the sensor corresponds to normal or abnormal temperature, power, and seismic activity conditions at the environment of the node, assigning a magnitude of the value to be positive if the response from the sensor corresponds to normal temperature, power, and seismic activity conditions at the environment of the node, assigning the magnitude of the value to be negative if the response from the sensor corresponds to abnormal temperature, power, and seismic activity conditions at the environment of the node, and summing the values for the sensors to determine the score for a particular node;

identifying, based on the scores, a node to grant exclusive access to the volume; and granting exclusive access to the volume to the identified node.

2. The method of claim 1, wherein receiving the request for exclusive access to the volume comprises:

receiving a first request from a first node; and receiving a second request from a second node.

3. The method of claim 1, wherein the data is requested from sensors at sites of the nodes in the cluster.

4. The method of claim 3, wherein the value for each sensor is determined based on a response from the sensor.

5. The method of claim 4, wherein determining, for each sensor, the value based on the response from the sensor comprises:

the magnitude of the value is assigned depending on whether the response from the sensor corresponds to normal or abnormal conditions at the environment of the node.

6. The method of claim 4, wherein the assigned value indicates the sensor failed to respond to the request for data.

7. The method of claim 3, wherein requesting the data from the sensors at the sites of the nodes in the cluster comprises:

requesting the data from sensors that measure temperature, power, and seismic activity.

8. The method of claim 3, wherein determining, for each node in the cluster, the score based on the data associated with the environment of the node comprises:

normalizing the values of the sensors associated with a particular node in the cluster.

9. The method of claim 8, wherein the values of the sensors are normalized by averaging the scores of the sensors at a particular site.

10. The method of claim 1, wherein identifying, based on the scores, the node to grant exclusive access to the volume comprises:

selecting the node whose score is at least a threshold amount greater than the scores of other nodes in the cluster.

11. A system comprising at least one hardware processor configured to:

receive a request for exclusive access to a volume;

determine, for each node in a cluster, a score based on data associated with an environment of the node, wherein the processor is further configured to:

use data from sensors at sites of the nodes in the cluster to determine a value for each sensor based on whether a response from the sensor corresponds to normal or abnormal temperature, power, and seismic activity conditions at the environment of the node, assign a magnitude of the value to be positive if the response from the sensor corresponds to normal temperature, power, and seismic activity conditions at the environment of the node, assign the magnitude of the value to be negative if the response from the sensor corresponds to abnormal temperature, power, and seismic activity conditions at the environment of the node, and sum the values for the sensors to determine the score for a particular node;

identify, based on the scores, a node to grant exclusive access to the volume; and grant exclusive access to the volume to the identified node.

12. The system of claim 11, wherein the processor is further configured to:

receive a first request from a first node; and receive a second request from a second node.

13. The system of claim 11, wherein the data is requested from sensors at sites of the nodes in the cluster.

14. The system of claim 13, wherein the value for each sensor is determined based on a response from the sensor.

15. The system of claim 14, wherein the processor is further configured to:

the assigned value indicates the sensor failed to respond to the request for data.

16. The system of claim 13, wherein the magnitude of the value is assigned depending on whether the response from the sensor corresponds to normal or abnormal conditions at the environment of the node.

17. The system of claim 13, wherein the processor is further configured to:

request the data from sensors that measure temperature, power, and seismic activity.

18. The system of claim 13, wherein the processor is further configured to:

normalize the values of the sensors associated with a particular node in the cluster.

19. The system of claim 18, wherein the values of the sensors are normalized according to a predetermined scale.

20. The system of claim 11, wherein the processor is further configured to:

select the node whose score is at least a threshold amount greater than the scores of other nodes in the cluster.

* * * * *